United States Patent Office 2,838,565
Patented June 10, 1958

2,838,565
PURIFICATION OF TEREPHTHALIC ACID

Royden Lewis Heath and Edmund Cecil Owen, Blackley, Manchester, England, assignors to Imperial Chemical Industries Limited, London, England, a corporation of Great Britain No Drawing. Application July 7, 1954
Serial No. 441,935

Claims priority, application Great Britain July 17, 1953

2 Claims. (Cl. 260—525)

This invention relates to the purification of terephthalic acid. More particularly it relates to the purification of terephthalic acid containing p-toluic acid.

In the preparation of terephthalic acid by the oxidation of para-substituted aromatic compounds such as para-xylene, the crude terephthalic acid produced contains small quantities of paratoluic acid. The complete purification of the terephthalic acid has presented some difficulty in the past.

It has been proposed to treat the mixture of terephthalic acid and para-toluic acid with water at a temperature of 100° C. to 200° C. and then to cool to below 200° C. and to isolate the purified terephthalic acid. We have found that this process is slow and cumbersome in that it necessitates the use of a large volume of water to purify a relatively small quantity of terephthalic acid This is because of the low solubility of terephthalic acid which is less than 2%.

According to the present invention, we provide an improved process for purifying crude terephthalic acid containing para-toluic acid which comprises heating the crude terephthalic acid with water to a temperature between 230° C. and 280° C., cooling the resultant solution to a temperature not below 165° C. and separating the terephthalic acid which crystallises out. If desired, the para-toluic acid may be isolated from the residual aqueous solution by further cooling.

In the manufacture of terephthalic acid by oxidation of, for example, para-xylene, the product is found to contain of the order of 5% para-toluic acid as an impurity. Using the process of our invention it is possible to obtain terephthalic acid of a very high degree of purity from such mixtures and to separate out the para-toluic acid completely. A further advantage of the process is that the product is obtained as a coarsely crystalline solid which facilitates filtration and washing.

We have found that the solubility of terephthalic acid in water at temperatures above 200° C. increases very suddenly. For example at a temperature of 250° the solubility of terephthalic acid is as high as 13% compared with less than 2% at a temperature of 200° C. and at 270° C. it is of the order of 25%. We have also found that while at temperatures above 165° C. para-toluic acid is completely soluble, separation below this temperature is likely. Thus, it is most important not to cool below 165° C. when crystallising out the terephthalic acid.

The following example in which all parts, are by weight, illustrates but does not limit the scope of our invention.

Example

One part of terephthalic acid containing 7% of p-toluic acid was charged into an autoclave with 7½ parts of water and the mixture heated to 200° C. and 195 lb. per sq. in. gauge pressure for 2 hours. The terephthalic acid was filtered off without cooling. The terephthalic acid so obtained was only 96% to 97% pure showing that only a partial removal of p-toluic acid had been effected under these conditions.

One part of crude terephthalic acid containing 7% of p-toluic acid was charged into an autoclave with 7½ parts of water and the mixture heated to 260° C. and 725 lb. per sq. in. gauge pressure for 1 hour. The mixture was cooled to 180° C. and 150 lb. per sq. in. and the crystalline terephthalic acid filtered off under these conditions. The terephthalic acid so obtained was 99–100% pure.

This example illustrates the improvement obtained using the process of our invention as opposed to that of the prior art.

The process of our invention has the great advantage for commercial operation, that complete solution of the crude terephthalic acid can be brought about using small amounts of water. If a temperature of the order of 280° C. is used only 3 parts of water to 1 part of crude terephthalic acid is required. It will be appreciated that at temperatures below 200° C. and a solubility of less than 2%, a ratio of more than 50 parts of water to 1 part of terephthalic acid will be required for complete solution, necessitating bulky vessels for large scale operation. Furthermore, the ease and efficiency of the crystallisation of the terephthalic acid are greatly increased by the higher concentration of the acid in solution.

Terephthalic acid is used in the manufacture of polyethylene terephthalate, a polyester of great commercial value as a fibre and film-forming material. It is essential that the terephthalic acid should be of as high a degree of purity as possible and the process of the present invention provides a very useful and simple method of producing terephthalic acid for this purpose.

What we claim is:

1. In a process for manufacturing terephthalic acid by the oxidation of para-xylene, the improvement which comprises dissolving the crude terephthalic acid oxidation product in water at a temperature between 230° C. and 280° C., cooling the resultant solution to a temperature not below 165° C. and separating the purified terephthalic acid which crystallizes out.

2. In a process for manufacturing terephthalic acid by the oxidation of para-xylene, the improvement which comprises dissolving one part of the crude terephthalic acid oxidation product in 7½ parts of water at a temperature of about 260° C. at super-atmospheric pressure for about one hour, cooling the resultant solution to a temperature of about 180° C. and separating the purified terephthalic acid which crystallizes out.

References Cited in the file of this patent

UNITED STATES PATENTS 2,572,575  Shafer et al. _____ Oct. 23, 1951
2,636,899  Burrows et al. _____ Apr. 28, 1953